United States Patent
Fiennes

(10) Patent No.: US 10,757,653 B2
(45) Date of Patent: *Aug. 25, 2020

(54) ELECTRONIC DEVICES FOR RECEIVING PUSHED DATA

(71) Applicant: Apple Inc., Cupertino, CA (US)

(72) Inventor: Hugo Fiennes, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,690

(22) Filed: Jan. 13, 2020

(65) Prior Publication Data

US 2020/0229094 A1 Jul. 16, 2020

Related U.S. Application Data

(63) Continuation of application No. 16/357,178, filed on Mar. 18, 2019, now Pat. No. 10,536,902, which is a
(Continued)

(51) Int. Cl.
*G08C 17/00* (2006.01)
*H04W 52/02* (2009.01)
(Continued)

(52) U.S. Cl.
CPC ....... *H04W 52/0229* (2013.01); *H04W 24/08* (2013.01); *H04W 52/028* (2013.01);
(Continued)

(58) Field of Classification Search
CPC ..... H04W 52/02; H04W 24/08; H04W 76/38; H04W 52/0241; H04W 52/028;
(Continued)

(56) References Cited

U.S. PATENT DOCUMENTS 6,098,108 A * 8/2000 Sridhar .................. H04L 29/06
709/239
6,330,234 B1 12/2001 Tomasi et al.
(Continued)

FOREIGN PATENT DOCUMENTS

KR          100782342 B1 * 12/2007 ........... H04L 12/189
WO         2008029314 A2    3/2008
WO      WO-2008112396 A1 *  9/2008 ......... H04L 61/2553

*Primary Examiner* — Mahendra R Patel
(74) *Attorney, Agent, or Firm* — Dickinson Wright RLLP

(57) ABSTRACT

Mobile devices such as cellular telephones are provided that communicate with wireless networks. Cellular telephone network equipment may communicate with a cellular telephone over a data connection. The cellular telephone may have an internet protocol (IP) address that allows data to be provided to the cellular telephone over the data connection. To conserve resources and release unused IP addresses, the cellular telephone network equipment may deactivate inactive data connections after a period of inactivity. A baseband processor within a mobile device may periodically send User Datagram Protocol (UDP) keep-alive packets over the data connection to ensure that the data connection remains active. The keep-alive packets may be directed to a packet sink server or may be associated with a black hole route. An applications processor in the telephone may remain in sleep mode during keep-alive packet transmission to conserve power.

20 Claims, 3 Drawing Sheets

Related U.S. Application Data continuation of application No. 15/918,749, filed on Mar. 12, 2018, now Pat. No. 10,237,823, which is a continuation of application No. 15/376,344, filed on Dec. 12, 2016, now Pat. No. 9,918,276, which is a continuation of application No. 12/210,953, filed on Sep. 15, 2008, now Pat. No. 9,521,625.

(51) Int. Cl.
*H04W 76/38* (2018.01)
*H04W 24/08* (2009.01)
*H04W 80/02* (2009.01)
*G06F 1/3293* (2019.01)
*G06F 1/3296* (2019.01)

(52) U.S. Cl.
CPC ... *H04W 52/0241* (2013.01); *H04W 52/0258* (2013.01); *H04W 52/0264* (2013.01); *H04W 52/0274* (2013.01); *H04W 76/38* (2018.02); *G06F 1/3293* (2013.01); *G06F 1/3296* (2013.01); *H04W 80/02* (2013.01); *Y02D 70/00* (2018.01); *Y02D 70/26* (2018.01)

(58) Field of Classification Search
CPC ......... H04W 52/0229; H04W 52/0274; H04W 52/0264; G06F 1/3293; G06F 1/3296; Y02D 70/00; Y02D 70/26; H04M 1/00; H04N 1/4092
USPC ............... 370/311, 217, 278; 1/1; 455/343.1
See application file for complete search history.

(56) References Cited

U.S. PATENT DOCUMENTS

| | | | |
|---|---|---|---|
| 7,467,312 B2 | 12/2008 | Esch et al. | |
| 7,898,994 B2* | 3/2011 | Zhao | H04W 52/0229 370/311 |
| 8,077,602 B2 | 12/2011 | Arimilli et al. | |
| 9,521,625 B2* | 12/2016 | Fiennes | H04W 52/0241 |
| 10,237,823 B2 | 3/2019 | Fiennes | |
| 2003/0064707 A1 | 4/2003 | Yoneyama | |
| 2005/0114719 A1* | 5/2005 | Stedman | G06F 1/3287 713/310 |
| 2006/0133401 A1 | 6/2006 | Ise et al. | |
| 2006/0146769 A1* | 7/2006 | Patel | H04W 52/0229 370/338 |
| 2007/0060125 A1* | 3/2007 | Rahim | H04W 48/16 455/436 |
| 2007/0082647 A1 | 4/2007 | Behzad et al. | |
| 2007/0082716 A1 | 4/2007 | Behzad et al. | |
| 2007/0104259 A1 | 5/2007 | Herring et al. | |
| 2007/0140159 A1* | 6/2007 | Eronen | H04L 61/2553 370/328 |
| 2007/0178888 A1* | 8/2007 | Alfano | H04W 48/18 455/414.1 |
| 2007/0189236 A1* | 8/2007 | Ranta-aho | H04L 1/0079 370/335 |
| 2007/0238437 A1* | 10/2007 | Jaakkola | H04W 52/0251 455/343.1 |
| 2007/0258402 A1* | 11/2007 | Nakamata | H04W 72/06 370/329 |
| 2008/0002612 A1* | 1/2008 | Haumont | H04W 36/0022 370/328 |
| 2008/0059582 A1* | 3/2008 | Hartikainen | H04L 67/145 709/204 |
| 2008/0154913 A1* | 6/2008 | Kohonen | H04L 67/325 |
| 2008/0225865 A1* | 9/2008 | Herzog | H04W 52/0229 370/401 |
| 2008/0232259 A1 | 9/2008 | Thomson | |
| 2008/0235552 A1* | 9/2008 | Tsai | H04L 1/1887 714/749 |
| 2009/0003252 A1 | 1/2009 | Salomone et al. | |
| 2009/0059899 A1 | 3/2009 | Bendelac | |
| 2009/0172117 A1 | 7/2009 | Bedi et al. | |
| 2009/0305732 A1 | 12/2009 | Marcellino et al. | |
| 2009/0307715 A1 | 12/2009 | Santamaria et al. | |
| 2010/0039971 A1* | 2/2010 | Lor | H04W 52/0274 370/311 |
| 2010/0069127 A1 | 3/2010 | Fiennes | |
| 2013/0190032 A1 | 7/2013 | Li | |
| 2017/0215143 A1 | 7/2017 | Fiennes | |
| 2018/0206191 A1 | 7/2018 | Fiennes | |

* cited by examiner

ELECTRONIC DEVICES FOR RECEIVING PUSHED DATA

CROSS-REFERENCE TO RELATED APPLICATIONS

This application is a continuation of U.S. patent application Ser. No. 16/357,178, filed Mar. 18, 2019, entitled "ELECTRONIC DEVICES FOR RECEIVING PUSHED DATA," set to issue as U.S. Pat. No. 10,536,902 on Jan. 14, 2020, which is a continuation of U.S. patent application Ser. No. 15/918,749, filed Mar. 12, 2018, entitled "ELECTRONIC DEVICES FOR RECEIVING PUSHED DATA," issued as U.S. Pat. No. 10,237,823 on Mar. 19, 2019, which is a continuation of U.S. patent application Ser. No. 15/376,344, filed Dec. 12, 2016, entitled "ELECTRONIC DEVICES FOR RECEIVING PUSHED DATA," issued as U.S. Pat. No. 9,918,276 on Mar. 13, 2018, which is a continuation of U.S. patent application Ser. No. 12/210,953, filed Sep. 15, 2008, entitled "ELECTRONIC DEVICES FOR RECEIVING PUSHED DATA," issued as U.S. Pat. No. 9,521,625 on Dec. 13, 2016, the contents of which are incorporated herein by reference in their entirety for all purposes.

BACKGROUND

This invention relates to electronic devices, and more particularly, to electronic devices such as cellular telephones that have data pushed to them from remote server(s).

Electronic devices such as cellular telephones have wireless capabilities. These wireless capabilities may be used to support voice and data traffic. Certain operations, such as operations involved in monitoring cellular telephone control channels for indicators of incoming calls can be handled by a type of integrated circuit called a baseband processor. The baseband processor is used to handle communications-related operations. Complex operations, such as those required when implementing graphics-intensive functions for a user of a smart phone, may be implemented by general purpose microprocessors. Because these general purpose microprocessors are used in handling functions related to implementing applications, they are sometimes referred to as applications processors.

An applications processor may be used to implement functions for a user such as media playback functions, email display functions, and web browsing functions. When a user of a cellular telephone is not actively using the telephone, the applications processor is not needed. The applications processor may therefore be shut down temporarily to conserve power.

Advanced communications services such as push email services require the presence of a persistent data connection between the cellular telephone and the internet. This allows the cellular telephone to receive packets of data from push email service(s) that inform the cellular telephone of the presence of new incoming email via this persistent network connection.

Cellular networks typically monitor the data connections of the cellular telephones that are using the network. If no data has been sent over a given data connection for a set period—for example thirty minutes, the cellular network assumes the data connection is not needed. The cellular network therefore tears down the data connection, so that the internet protocol (IP) address associated with the data connection and other system resources can be made available to other users. Although this approach helps the cellular network manage its bandwidth, it causes problems for users of push email services as the notification path is no longer available. In particular, a user of a cellular telephone whose data connection has been torn down by the cellular network will not receive new-mail-available packets from the push email service to alert the user of incoming email.

To prevent cellular networks from prematurely terminating the data connection between the cellular telephone and the cellular telephone, some conventional cellular telephones use their applications processors to periodically wake and send data packets to a remote server. This data transmission activity serves to prevent the cellular network from tearing down the data connection and thereby makes it possible for the cellular telephone to properly receive new-mail-available packets. Use of the applications processor to send these data packets (which can be empty, as meaningful data is not required to keep the cellular network from tearing down the connection) can, however, shorten battery life as the applications processor's boot-up and shut-down overhead can be very large. In situations in which the applications processor has been placed in a sleep mode, the process of waking up the applications processor to send the (optionally empty) data packets to the remote server may consume undesirably large amounts of power.

A flow chart of conventional steps involved in maintaining active data connections between cellular telephones and cellular telephone networks so that the cellular telephones may receive push email or notifications are shown in FIG. 2. Operations of the type shown in FIG. 2 may be performed by cellular telephones that contain baseband processors and applications processors. To conserve power, the applications processor in a given cellular telephone may be placed in a sleep state when not in use.

As an example, assume that the operations of FIG. 2 are intended for a cellular telephone network that would deactivate a data connection if there is inactivity thirty (30) minutes after the last acknowledgement or packet is transacted with the cellular telephone. Other cellular networks may have different fixed or variable inactivity time-outs.

At step 36, the cellular telephone determines whether 29.5 minutes (assuming a thirty minute timeout) have elapsed since the last data transmission to/from the cellular telephone network has been sent/received. If 29.5 minutes has not elapsed, an internal timer is incremented and, as indicated schematically by line 38 in FIG. 2, waiting continues at step 36. The timer used to wake the applications processor is typically implemented using system power management circuitry.

If, at step 36, it is determined that 29.5 minutes has elapsed since the last data transmission, operations proceed to step 40. At step 40, the applications processor is awakened. For example, if the timer is implemented in power management circuitry, the power management circuitry awakes the applications processor.

At step 42, the applications processor sends (via the baseband processor) an (optionally empty) data packet to a remote server. Because the empty data packet is recognized by the cellular network as active data traffic, the cellular network resets its inactivity timer and does not deactivate the data connection between the cellular telephone and the network. This data connection will therefore remain available for the cellular telephone to use in receiving notifications from a remote push email service. When email is available for the user of the cellular telephone, an email server may send a packet to the cellular telephone that indicates to the cellular telephone that the applications processor should wake up to check for email or other push data.

After the applications processor has sent the empty data packet to the remote server at step 42, the applications processor may be returned to its sleep state at step 44 to conserve power.

As indicated by line 46, the process of FIG. 2 may be repeated continuously.

While the FIG. 2 arrangement may be satisfactory for maintaining the persistent data connections that are needed to receive push email, the need to repeatedly activate the applications processor to send empty data packets to the remote server wastes power. This is because the applications processor generally consumes a significantly larger amount of power than the baseband processor.

It would therefore be desirable to be able to provide electronic devices that more efficiently handle duties associated with supporting data services such as push email.

SUMMARY

Electronic devices such as cellular telephones and other mobile devices are provided that communicate wirelessly with cellular telephone network equipment. When communicating wirelessly in this way, a data connection may be established between a mobile device and the cellular telephone network equipment. The mobile device may have an internet protocol (IP) address, so that push email and other push data (pushed data) may be transmitted to the mobile device over the data connection.

To receive push data, it is desirable to maintain the data connection between the mobile device and the cellular network equipment in an active state. The cellular network equipment will generally deactivate inactive data connections after a given period of inactivity. This allows the cellular network equipment to conserve network resources and release IP addresses for use where currently needed.

The mobile devices may include baseband processor integrated circuits and general purpose processors that are sometimes referred to as applications processors. Applications processors may be used to implement games, productivity applications, web browsers, media playback functions, and applications for other user services. When an application is running on the applications processor, the applications processor typically consumes a significantly larger amount of power than the baseband processor.

To conserve power when the applications processor is not in active use, the applications processor may be placed in a low-power sleep mode. In the event that incoming push email or other such push data is to be processed, the applications processor may be powered up.

While the applications processor is in sleep mode (or at other suitable times), the baseband processor (or other suitable circuitry such as an integrated circuit that consumes less power than the applications processor) may periodically transmit keep-alive packets over the data connection. The keep-alive packets may be compliant with a protocol such as the User Datagram Protocol (UDP). UDP packets are ideal in this context as the protocol does not call for a response packet from the destination host and hence will not cause the baseband processor to wake the applications processor when a reply packet arrives.

The keep-alive packets may be addressed to a packet sink server that discards incoming packets or may be associated with a black hole route. To ensure that the data connection remains active, the baseband processor may transmit the keep-alive packets so that the maximum period of time for which the data connection is inactive is less than the network inactivity timeout value that triggers the cellular network equipment to begin deactivate a data connection.

Further features of the invention, its nature and various advantages will be more apparent from the accompanying drawings and the following detailed description of the preferred embodiments.

DETAILED DESCRIPTION

Figure 1:
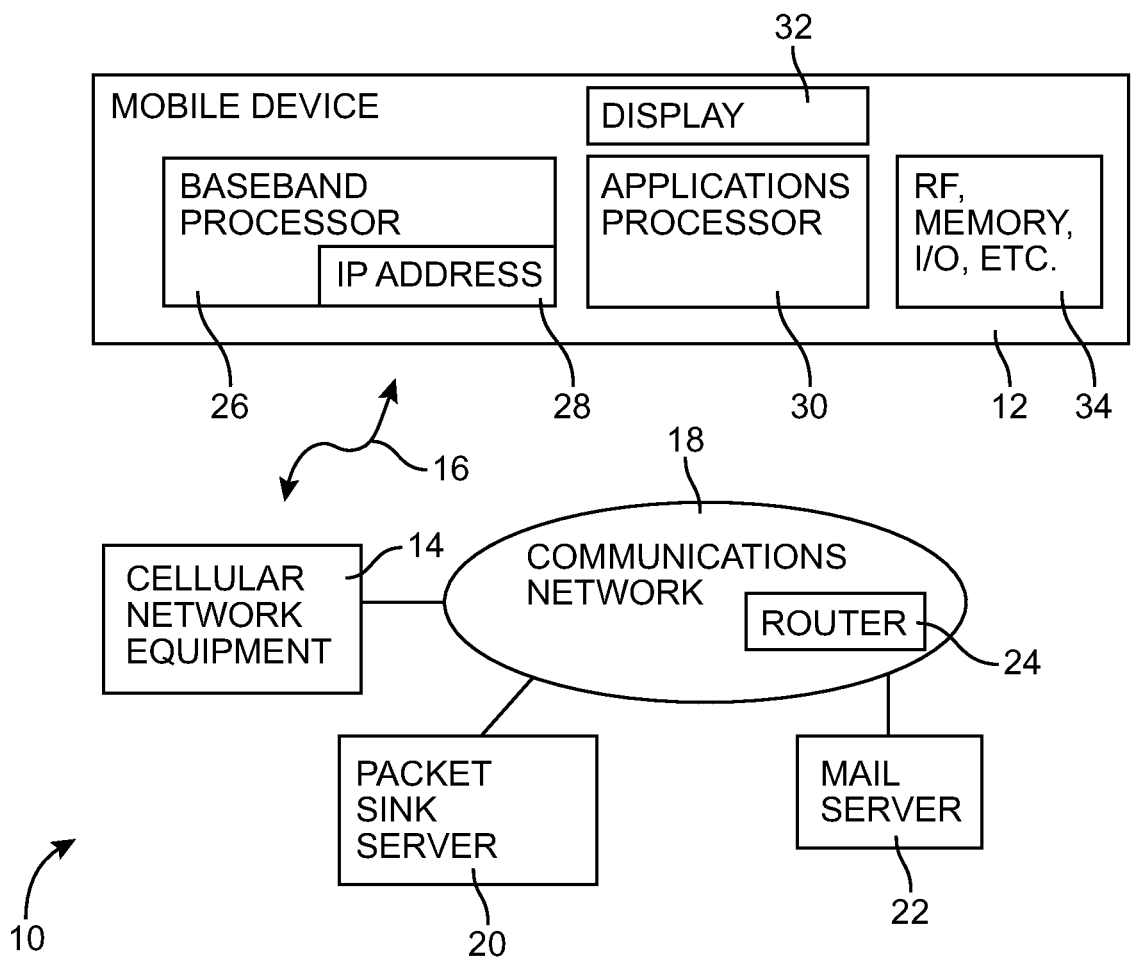
FIG. 1 is a schematic diagram of a system in which a mobile device may be used to receive push data over a wireless communications network in accordance with an embodiment of the present invention.
Figure 2:
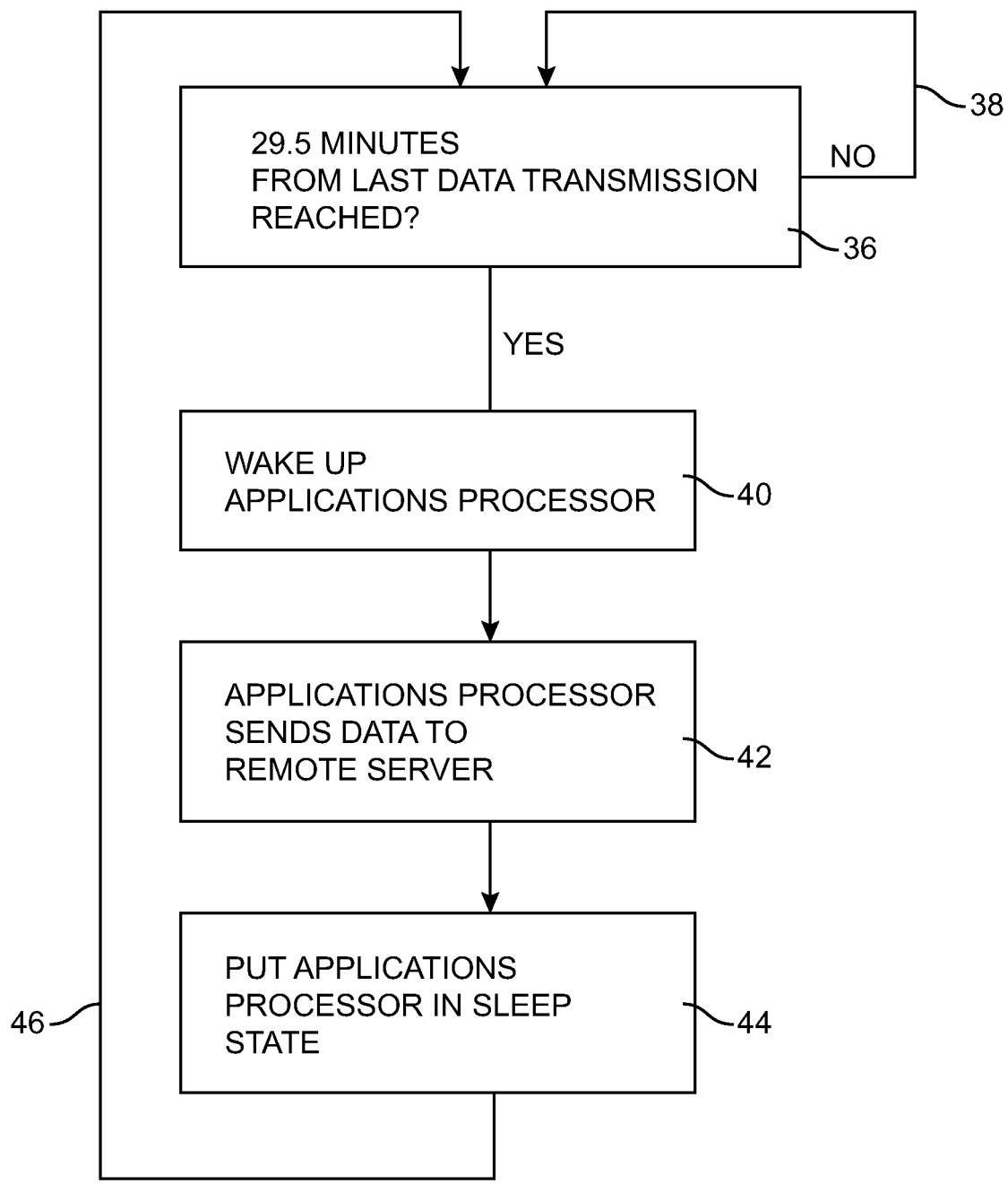
FIG. 2 is a flow chart of conventional steps involved in operating cellular telephones that receive push email.

The present invention relates to electronic devices such as cellular telephones and other devices that use wireless communications to have data pushed to them from remote sources. Electronic devices such as these may be provided in the form of mobile equipment such as laptop computers, handheld devices, pendant or wearable devices such as wristwatch devices, or other miniature or portable equipment. Electronic devices that have data pushed to them from remote sources may also be larger devices (e.g., desktop computers).

Particularly in mobile wireless devices, it is important to minimize power consumption. Devices with excessive power consumption may be subject to faster battery drain. This can lead to undesirable interruptions in operation when a user is not able to charge a device from a wall outlet.

Baseband processors are dedicated wireless communications integrated circuits that are specifically optimized to perform network presence activity using relatively small amounts of power. Baseband processors may be used to handle wireless communications functions such as functions related to monitoring a wireless control channel (or other signaling mechanism) for notifications of incoming telephone calls. Some cellular telephones can operate exclusively using a baseband processor. An advantage of using a dedicated baseband processor is that this type of integrated circuit consumes a relatively modest amount of power.

Although baseband processors can be used to handle wireless communications functions in a cellular telephone, baseband processors are generally unable to handle complex tasks associated with smart phones. For example, baseband processors are not generally able to handle the functions involved in implementing applications such as web browsing applications, complex media playback operations, word processing applications, spreadsheet applications, etc. To handle advanced applications such as these, smart phones are typically provided with additional processing circuitry in the form of a general purpose microprocessor. Because the general purpose microprocessor is being used at least in part to implement applications, the general purpose microprocessor is sometimes referred to as the "applications processor."

In their respective active modes, applications processors typically require much more power to operate than baseband processors. To conserve power, smart phones may place an applications processor in a low-power state (sometimes referred to as a sleep state or sleep mode) when the applications processor is not in active use. While the applications processor is in the sleep state, the baseband processor remains active to monitor the cellular network for notifications of incoming email. If a packet arrives from the network, for example an incoming mail notification sent from a remote mail server, the baseband processor will turn on the applications processor. The applications processor may then be used in processing the incoming email. The baseband processor serves only as a conduit for this data, it does not understand or otherwise process the data passing through it.

Push data services such as push email services generally require an active internet connection. If a cellular telephone does not have this type of active data connection, push email from a remote email server may not be properly received. Cellular networks typically deactivate inactive data connections after a given period of inactivity (e.g., 30 minutes) to conserve network resources. To ensure that the data connection is not deactivated by the cellular network in this way, some conventional cellular telephones may periodically transmit data packets (optionally empty) over the wireless network connection between the cellular telephone and the cellular network using the applications processor. These periodic transmissions ensure that sufficient activity is present over the network connection to prevent the cellular network from deactivating the connection.

When this approach is used, push email will be properly received by the cellular telephone. However, because the applications processor is used in forming the data packets to be transmitted, the applications processor must be periodically powered to its active state to keep the network connection active. In situations in which the applications processor would otherwise be in its sleep state, more power will be consumed than is desirable, solely for the purpose of keeping the network connection active in order to receive data pushed to it.

In accordance with at least some embodiments of the invention, mobile devices such as cellular telephones may keep a persistent connection to receive push data from remote data services with reduced power consumption. The reduced power consumption stems from using a lower power processor such as the baseband processor to send a packet to the network to prevent deactivation of the data connection.

An illustrative system 10 in accordance with at least some embodiments of the invention is shown in FIG. 1. As shown in FIG. 1, mobile device 12 may communicate with cellular network equipment 14 over a wireless communications path such as path 16. Mobile device 12 may be a cellular telephone such as an iPhone® or an iPod® (both products of Apple, Inc.), or devices such as notebook computer, handheld device, or other portable device that contains cellular telephone communications circuitry. Communications network 18 may include local and wide area networks such as the internet. Routers such as router 24 may be used to convey data within communications network 18. Components such as mail server 22, packet sink server 20, and other data processing components may be connected to communications network 18. Packet sink server 20 may be used as a destination for keep-alive packets that are used to maintain active data connections between mobile device 12 and cellular network equipment 14. Packet sink server 20 may be implemented using components that are separate from cellular network equipment 14 or may be implemented using components that make up part of cellular network equipment 14.

Mobile device 12 may include baseband processor 26 and applications processor 30. Baseband processor 26 may handle communications functions such as communications functions involved in monitoring control traffic between cellular network equipment 14 and device 12. Applications processor 30 may be a general purpose microprocessor that is used in presenting a graphical user interface for a user of device 12 and that is used in implementing applications such as email reader applications, web browsing applications, spreadsheet and word processing applications, graphics applications, media playback applications, etc.

Additional components such as display 32 and circuitry 34 may also be included in device 12. Display 32 may be, for example, a liquid crystal display (LCD) with (or without) an integrated touch screen. Circuitry 34 may include radio-frequency circuitry such as input and output radio-frequency amplifiers, antennas, memory chips, input-output devices such as buttons, touch pads, microphones, speakers, light-emitting diodes, cameras, audio and video connectors, data ports, batteries and power management circuitry, etc.

In accordance with at least some embodiments of the invention, the applications processor can be maintained in a low power or sleep state without being awoken periodically to send a data packet to keep alive a data connection. This may be accomplished by using a baseband processor such as baseband processor 26 of FIG. 1 to handle functions involved in keeping the data connection with cellular network 14 in an active state, which may serve to conserve battery charge. If desired, the baseband processor may handle these "keep-alive" functions even in situations in which the applications processor is not in a sleep state, although the use of the baseband processor to avoid the need to wake up the applications processor may be particularly useful in reducing power consumption.

Figure 3:
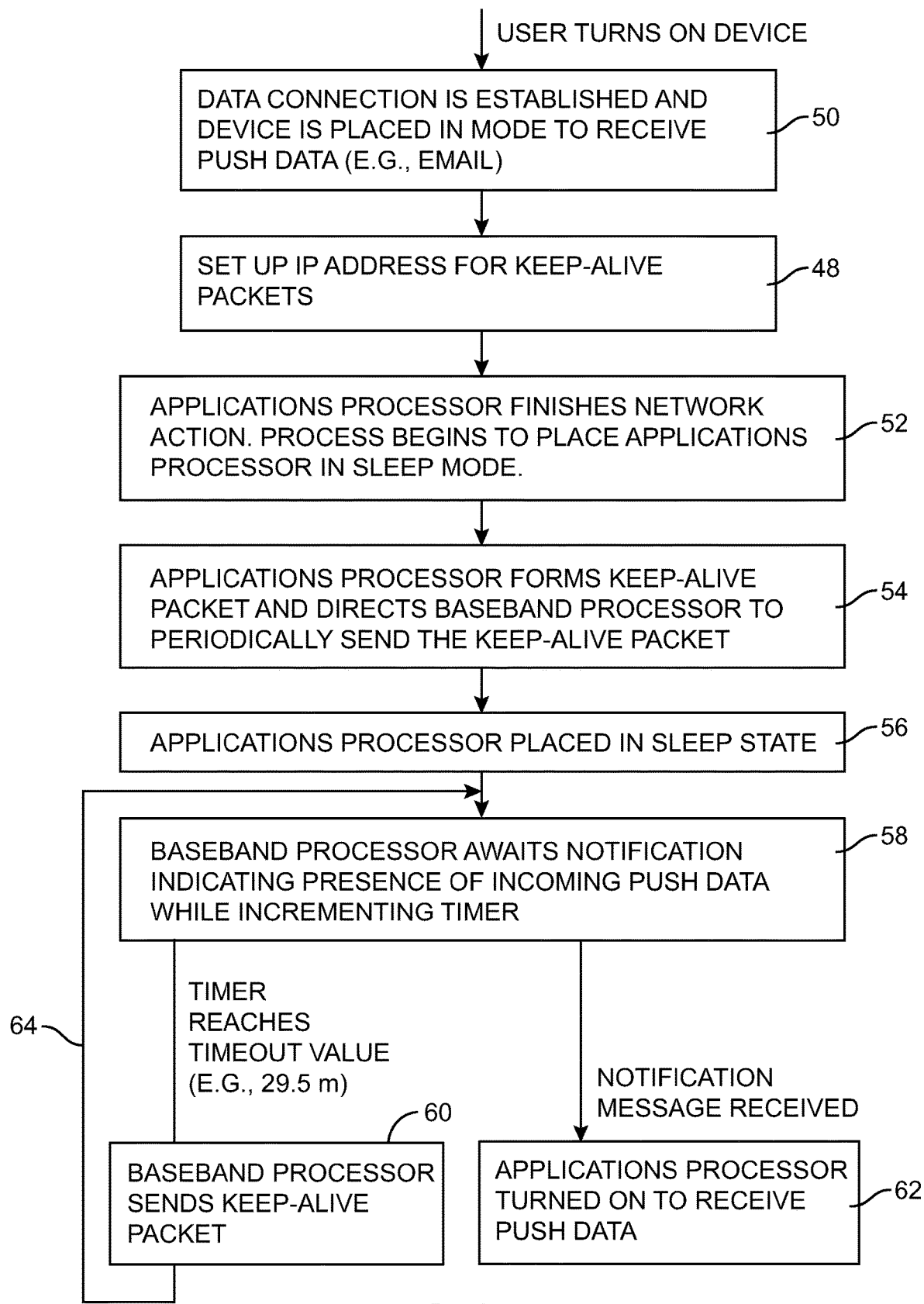
FIG. 3 is a flow chart of illustrative steps involved in operating a cellular telephone in a system of the type shown in FIG. 1 in accordance with an embodiment of the present invention.

Illustrative steps involved in using mobile device 12 in system 10 of FIG. 1 in accordance with embodiments of the present invention are shown in FIG. 3.

When device 12 is turned on, device 12 establishes a network data connection (step 50). The network data connection may be used to receive push email or other push data from a remote service such as mail server 22.

At step 48, the IP address to which keep-alive data packets are sent is determined. Any suitable technique may be used to determine this IP address. For example, the IP address may be determined by using a domain name service (DNS) lookup operation after the data connection of step 50 has been established. With this type of approach, periodic changes to the IP address will be automatically reflected in the updated results of the lookup operation. A DNS entry may have an expiration time after which its IP address is no longer valid. An up-to-date lookup operation may be required when the IP address expires in this way. Any suitable technique may be used to ensure that the IP address obtained from the DNS lookup operation is valid. For example, applications processor 30 may periodically be awoken to repeat the DNS lookup operation.

The IP address that is determined at step 48 (shown as IP address 28 in FIG. 1) may be associated with any suitable network destination. For example, IP address 28 may be associated with a "black hole route." Routers such as router 24 may have associated IP addresses. In a black hole route scenario, a router such as router 24 in network 18 may be informed that all packets to a particular IP address should be dropped. This black hole route IP address may then be provided to baseband processor 26 as IP address 28. With another suitable arrangement, IP address 28 may be associated with a special server on network 18 such as packet sink server 20. Server 20 may the act as a destination for keep-alive packets from baseband processor 26. Typically, in order to allow for services and servers to move to different physical networks, the IP address of the packet sink server or blackhole route address would be obtained using a DNS lookup when the network connection is first established (step 48).

After the user has finished using applications on device 12 (e.g., after finishing the use of a game or business productivity application) and after the communications operations associated with receiving push data over the data connection have been completed, operations may be commenced to place applications processor 30 in sleep mode to conserve power (step 52).

Before entering sleep mode, applications processor 30 forms a keep-alive packet that includes IP address 28 for use by baseband processor 26. Any suitable format may be used for the keep-alive packet. With one illustrative arrangement, a keep-alive packet may be formed that is compliant with the User Datagram Protocol (UDP), but this is merely an example and other types of packets may be used if desired. No state information is contained in a valid UDP packet (e.g., a UDP keep-alive packet). UDP packets may be preferred over packets formed in accordance with other protocols (e.g., Transmission Control Protocol or TCP), because the UDP scheme allows UDP packets to be dropped by receiving equipment without issuing a response. A TCP keep-alive packet would necessarily cause the generation of an acknowledgement (e.g., a ACK or NAK packet). Such acknowledgements would be sent back to the transmitter (e.g., baseband processor 26), at which point the transmitter would handle the acknowledgement (e.g., possibly by waking up applications processor 30 and thereby consuming additional power).

The keep-alive packet that is formed may contain no data, null data, or any other suitable data (payload). Information that is required by the protocol being used to form the packet (e.g., destination IP address information corresponding to IP address 28, source IP address assigned to the device by the network, check sum data, etc.) may be included in the keep-alive packet. During the operations of step 54, applications processor 30 may direct baseband processor 26 to periodically transmit the keep-alive packet that has been previously prepared by the applications processor.

At step 56, once the applications processor has finished all pending tasks and has instructed baseband processor 26 to transmit the keep-alive packet, device 12 may place applications processor 30 in a sleep state. During the sleep state, applications processor 30 may consume significantly less power than applications processor 30 would otherwise consume (e.g., one tenth or one hundredth or less of the power that would be consumed when actively using applications processor 30 to implement a desired application).

After placing applications processor 30 in sleep mode, baseband processor 26 awaits an incoming notification from cellular network equipment 14 indicating that push data is available (step 58). If a notification is received, baseband processor 26 can turn on applications processor 30 at step 62. After the applications processor 30 leaves its sleep state and becomes active, the applications processor 30 may be used to receive push data from server 22 over the active data connection maintained by cellular network equipment 14.

During step 58, baseband processor 26 may increment a timer. The timer may be implemented using hardware and/or software. For example, the timer may be implemented using timer resources within baseband processor 26 or other suitable circuitry in device 12. If desired, the timer may be implemented using clock information obtained from cellular network equipment 14 or clock information maintained by a software timer. Timer functionality may also be implemented as part of another available integrated circuit such as a power management unit. Timer functions may, in general, be implemented using these arrangements, combinations of such arrangements, or other suitable timer arrangements. The use of a timer implemented in baseband processor 26 is merely illustrative.

After a given amount of time has expired without receiving a push data notification, the timer will reach its timeout value. The timeout value for step 58 is preferably configured to be less than the inactivity timeout value used by cellular network equipment 14 in determining when to deactivate data connections to release IP addresses. For example, if cellular network equipment 14 is configured to deactivate inactive connections after 30 minutes of inactivity, the timeout value for baseband processor 26 may be set to a value that is slightly less than this value such as 29.5 minutes.

The use of a 29.5 minute timeout value is merely illustrative. If cellular network equipment 14 is configured to deactivate inactive connections after some other period of activity, the timeout value for baseband processor 26 may be set to a value that is slightly less than that period. If desired, device 12 may use different timeout values in different circumstances. Device 12 may, for example, use timeout values that vary depending on factors such as the identity of the network that is being used by device 12, the user's level of service, the date and time of day, network traffic conditions, etc. Information on these factors may be provided to device 12 from a remote server (e.g., a server that device 12 may query for this information), as part of a software update, as part of a message sent to device 12, or using any other suitable technique. For example, applications processor 30 may, before entering the sleep state at step 56, inform baseband processor 26 of an appropriate initial timeout value for use at step 58 based on the applications processor's knowledge about the time of the last network interaction. If the last interaction occurred about 15 minutes before the sleep state is entered, the initial timeout value provided to the baseband processor might be about 14.5 minutes (in the illustrative situation where the network's inactivity timer uses a 30 minute threshold).

Once baseband processor 26 determines that the specified amount of time has passed without detecting an incoming push data notification, baseband processor 26 may transmit the keep-alive packet (step 60) over the active data connection between mobile device 12 and cellular network equipment 14. The transmitted keep-alive packet will be delivered to its destination address 28 by the resources of network 18. The transmission of the keep-alive packet creates network traffic that keeps the data connection active. In particular, when cellular network equipment 14 detects network traffic such as the keep-alive packet, cellular network equipment 14 resets its network activity timers. If no activity were detected for a certain period of time (e.g., 30 minutes or other suitable period of time), cellular network equipment 14 would deactivate the data connection to make network resources (i.e., the IP address of the data connection) available to other users. When the keep-alive packet is detected, cellular network equipment 14 is prevented from detecting 30 minutes (or other such time period) of contiguous inactivity.

As shown by line 64 processing can loop back to step 58, where baseband processor 26 can again await a push data notification or expiration of the timer. After the baseband processor sends the first keep-alive packet at step 60, the baseband processor can reload (update) the timeout value with a correct "full" interval time (e.g., 29.5 minutes) for use during subsequent iterations of step 58.

As this example demonstrates, periodic transmission of keep-alive packets by baseband processor 26 ensures that the data connection between device 12 and network 14 remains active to support the receipt of push data without requiring that applications processor 30 be periodically powered up, thereby conserving power.

The foregoing is merely illustrative of the principles of this invention and various modifications can be made by those skilled in the art without departing from the scope and spirit of the invention.

What is claimed is:

1. A method of using a wireless device that includes a baseband processor and an applications processor to maintain a data connection to receive data from a remote service over the data connection between the wireless device and a cellular network, the method comprising:
   establishing the data connection to receive data from the remote service;
   causing the applications processor to enter a power-reduced mode to conserve power in the wireless device, after data reception completes; and
   while the applications processor is in the power-reduced mode, sending a keep-alive packet over the data connection to a server using the baseband processor,
   wherein the keep-alive packet is provided to the baseband processor by the applications processor before being entering the power-reduced mode.

2. The method of claim 1, wherein the keep-alive packet includes an Internet Protocol (IP) address of the server to which to send the keep-alive packet.

3. The method of claim 2, wherein the IP address is associated with a black hole route to which packets sent to the IP address are dropped.

4. The method of claim 2, wherein the IP address is for a packet sink server for reception of keep-alive packets.

5. The method of claim 2, further comprising the applications processor determining the IP address based on a domain name service (DNS) lookup operation after the data connection is established.

6. The method of claim 5, wherein:
   a DNS entry for the IP address includes an expiration time; and
   the method further comprises causing the applications processor to exit the power-reduced mode to repeat the DNS lookup operation and provide an updated keep-alive packet to the baseband processor.

7. The method of claim 1, wherein the keep-alive packet is compliant with a User Datagram Protocol (UDP) that does not require a response to the keep-alive packet.

8. The method of claim 1, wherein the keep-alive packet includes a null data payload.

9. The method of claim 1, wherein the baseband processor sends an initial keep-alive packet after a first time period corresponding to a first time-out value provided by the applications processor.

10. The method of claim 9, wherein the first time-out value is based on an elapsed time of a most recent network interaction by the wireless device with the cellular network.

11. The method of claim 10, wherein the baseband processor sends a subsequent keep-alive packet after a second time period corresponding to a second time-out value that is longer than the first time-out value.

12. The method of claim 11, wherein the second time-out value is based on an inactivity timeout value for the cellular network to deactivate the data connection.

13. The method of claim 1, wherein transmission of the keep-alive packet creates network traffic with the cellular network to keep the data connection active.

14. An apparatus configurable for operation in a wireless device, the apparatus comprising:
   a first processor configured for communicating with a cellular network; and
   a second processor configured for implementing applications,
   wherein the first processor is configured to perform actions that include:
     establishing a data connection to receive data from a remote service;
     causing the second processor to enter a power-reduced mode to conserve power in the wireless device, after data reception completes; and
     while the second processor is in the power-reduced mode, sending a keep-alive packet over the data connection to a server using the first processor,
     wherein the keep-alive packet is provided to the first processor by the second processor before entering the power-reduced mode.

15. The apparatus of claim 14, wherein the keep-alive packet includes an Internet Protocol (IP) address of the server to which to send the keep-alive packet, the IP address determined by the second processor based on a domain name service (DNS) lookup after establishment of the data connection.

16. The apparatus of claim 14, wherein the first processor sends an initial keep-alive packet after a first time period that is based on an elapsed time of a most recent network interaction by the wireless device with the cellular network.

17. The apparatus of claim 14, wherein transmission of the keep-alive packet creates network traffic with the cellular network to keep the data connection active.

18. A wireless device comprising:
   radio frequency circuitry for transmission and reception of wireless signals;
   a memory storing executable instructions;
   a first processor configured for communicating with a cellular network; and
   a second processor configured for implementing applications,
   wherein execution of the executable instructions by the first processor causes the first processor to perform actions including:
     establishing a data connection to receive data from a remote service;
     causing the second processor to enter a power-reduced mode to conserve power in the wireless device, after data reception completes; and
     while the second processor is in the power-reduced mode, sending a keep-alive packet over the data connection to a server using the first processor,
     wherein the keep-alive packet is provided to the first processor by the second processor before entering the power-reduced mode.

19. The wireless device of claim 18, wherein the server comprises a packet sink server that discards incoming packets or a router associated with a black hole route.

20. The wireless device of claim 18, wherein transmission of the keep-alive packet creates network traffic with the cellular network to keep the data connection active.

* * * * *

UNITED STATES PATENT AND TRADEMARK OFFICE
CERTIFICATE OF CORRECTION

PATENT NO. : 10,757,653 B2  
APPLICATION NO. : 16/741690  
DATED : August 25, 2020  
INVENTOR(S) : Hugo Fiennes Page 1 of 1

It is certified that error appears in the above-identified patent and that said Letters Patent is hereby corrected as shown below:

In the Claims

In Claim 1, at Column 9, Line 33: "processor by the applications processor before being" should read -- processor by the applications processor before --.

Signed and Sealed this  
Twenty-ninth Day of September, 2020

Andrei Iancu  
*Director of the United States Patent and Trademark Office*